Figure 1:
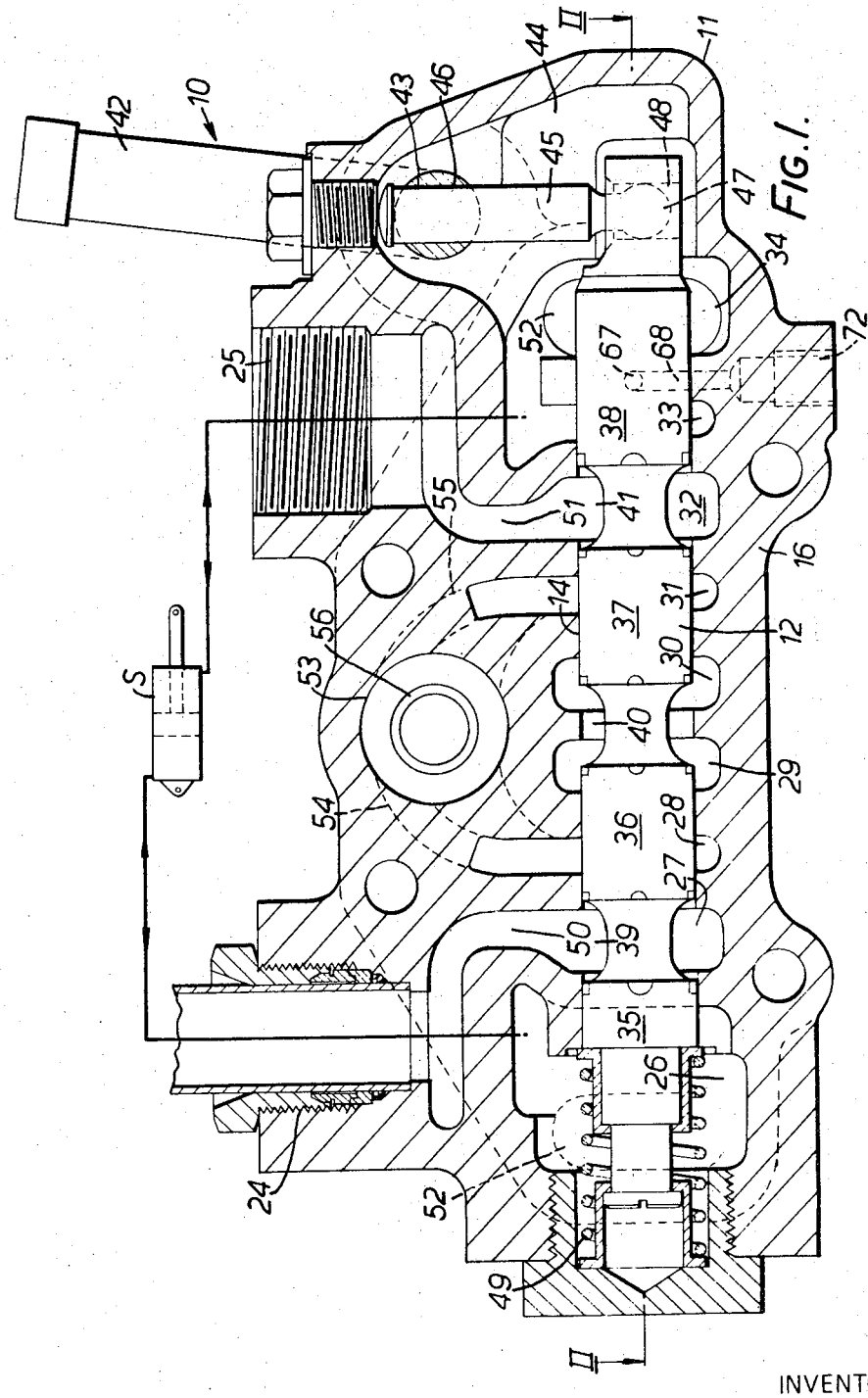

United States Patent
Boydell

[11] 3,717,175
[45] Feb. 20, 1973

[54] SELECTOR VALVES

[75] Inventor: Kenneth Raymond Boydell, Tewkesbury, England

[73] Assignee: Dowty Technical Developments Limited, Cheltenham, England

[22] Filed: April 8, 1971

[21] Appl. No.: 132,478

[52] U.S. Cl. ............137/596.13, 60/52 VS, 60/97 P
[51] Int. Cl. .............................................F16k 11/00
[58] Field of Search............137/596.13, 596.12, 596; 60/97 P, 52 VS; 91/431, 449

[56] References Cited

UNITED STATES PATENTS

| | | | |
|---|---|---|---|
| 3,366,064 | 1/1968 | Stephens et al. | 60/52 VS X |
| 2,941,365 | 6/1960 | Carlson et al. | 60/97 P X |
| 2,319,551 | 5/1943 | Linden et al. | 60/97 P X |

FOREIGN PATENTS OR APPLICATIONS

| | | | |
|---|---|---|---|
| 1,129,777 | 4/1955 | France | 60/97 P |

*Primary Examiner*—Henry T. Klinksiek
*Assistant Examiner*—Robert J. Miller
*Attorney*—Young & Thompson

[57] ABSTRACT

A selector valve having a valve element and a first unloader passage and a subsidiary unloader passage both communicable with exhaust and respectively associable with a first inlet connection and a second inlet connection. The valve element is movable from a first position, in which the first inlet connection is in communication with the first unloader passage and in which the element co-operates with the subsidiary unloader passage to produce a first fluid pressure at the second inlet connection, to another position, in which the first inlet connection is in communication with a service-line connection and in which the element co-operates with the subsidiary unloader passage to produce a change in pressure at said second inlet connection.

12 Claims, 4 Drawing Figures

INVENTOR
KENNETH RAYMOND BOYDELL
BY
Young & Thompson
ATTORNEYS

SELECTOR VALVES

This invention relates to selector valves suitable for use in fluid-pressure-operable systems.

According to this invention a selector valve includes a casing having a valve element, a first inlet connection, a second inlet connection and a service-line connection, a first unloader passage associable with said first inlet connection and a subsidiary unloader passage associable with said second inlet connection, both said unloader passages being communicable with exhaust, and said valve element being movable from a first position, in which said first inlet connection is in communication with the first unloader passage and hence with exhaust and in which said element co-operates with the subsidiary unloader passage to produce a first fluid pressure at said second inlet connection, to another position, in which said first inlet connection is in communication with said service-line connection and in which said element co-operates with the subsidiary unloader passage to produce a change in the pressure at said second inlet connection.

The second inlet connection may be connectible to a part of a fluid-pressure-operable system, and when the valve element is in said first position said second inlet connection may be open through said subsidiary unloader passage to exhaust so that said part is subjected to low pressure, but when the valve element is moved to another position pressure build up can occur at said second inlet connection.

The first unloader passage may be connectible to exhaust through a first exhaust connection and the subsidiary unloader passage may be connectible to exhaust through a second exhaust connection.

The selector valve may include a plurality of said valve elements arranged in banked manner, at least one of said service-line connections being provided for each element, and said first inlet connection and said second inlet connection being common to the banked valve.

The or each valve element may be of spool type housed in a respective bore formed in said casing. Where more than one valve element is provided they may be each housed in an individual casing plate, the casing plates being assembled in stacked relationship. The first inlet connection and the first exhaust connection may be provided in end casing plates forming end closure portions for the stacked casing plates of the bank, all the casing plates together forming said casing.

The second inlet connection and the second exhaust connection may respectively be formed in said end casing plates, or alternatively, may be respectively formed in two of the casing plates which each house a valve element. The subsidiary unloader passage may include drillings provided in the casing with which a drilling, formed in and arranged transversely of the or each element, aligns when the element is in its said first position.

Figure 2:
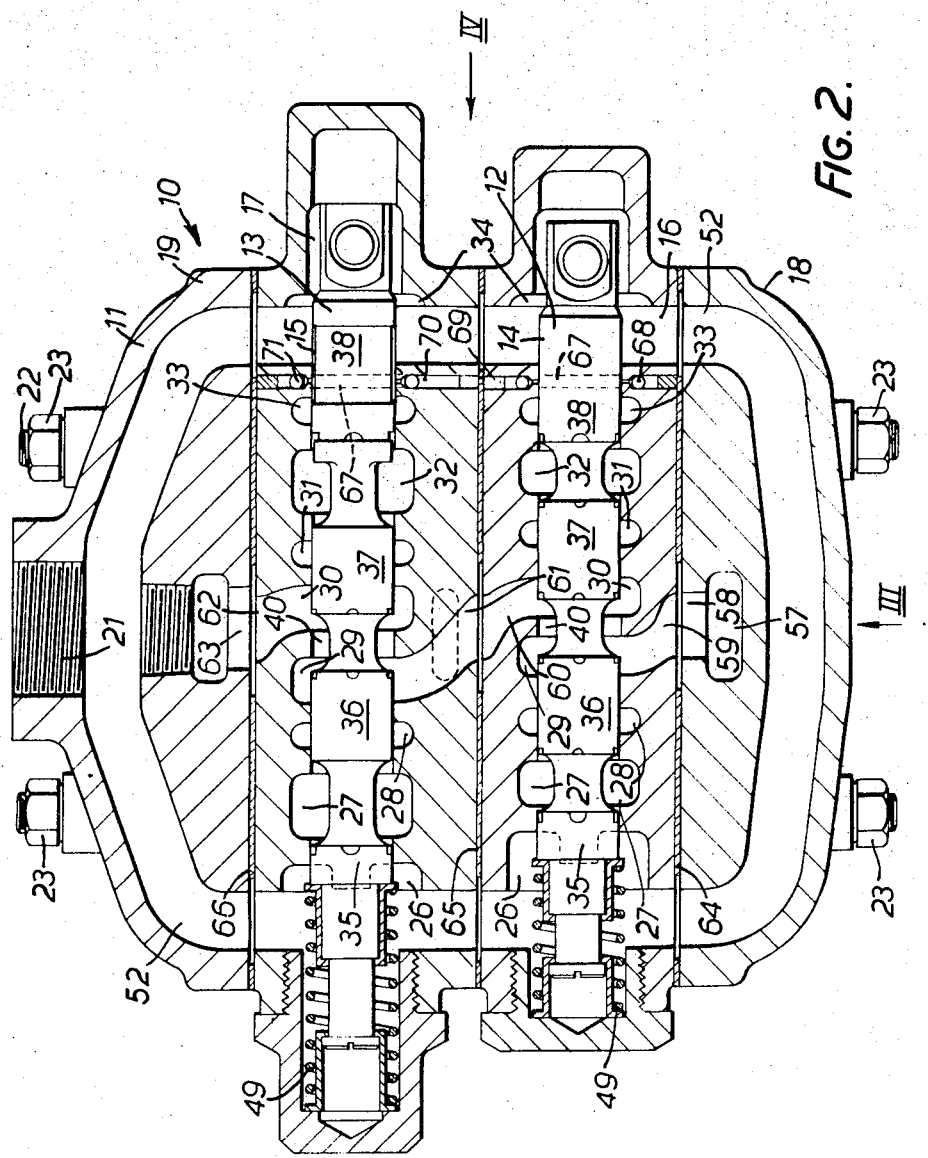
Figure 3:
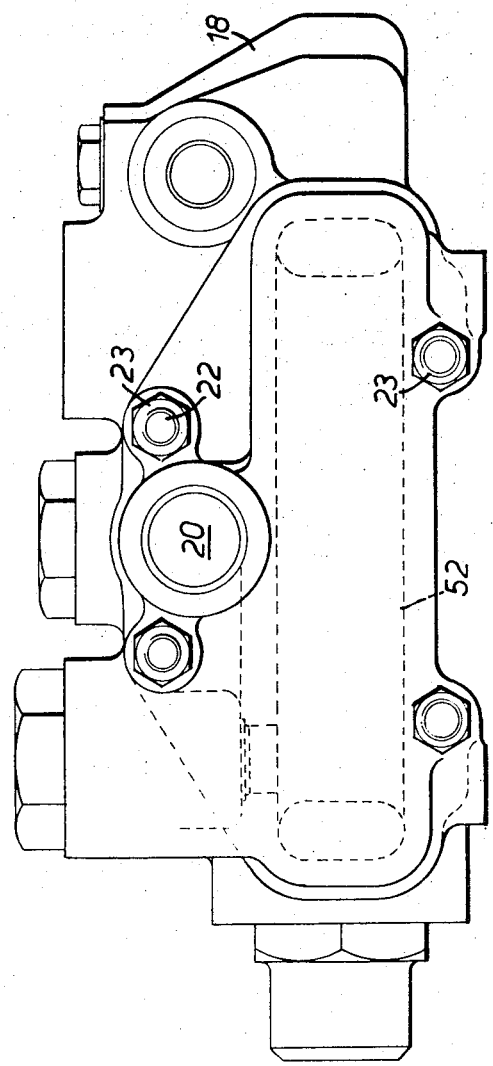
Figure 4:
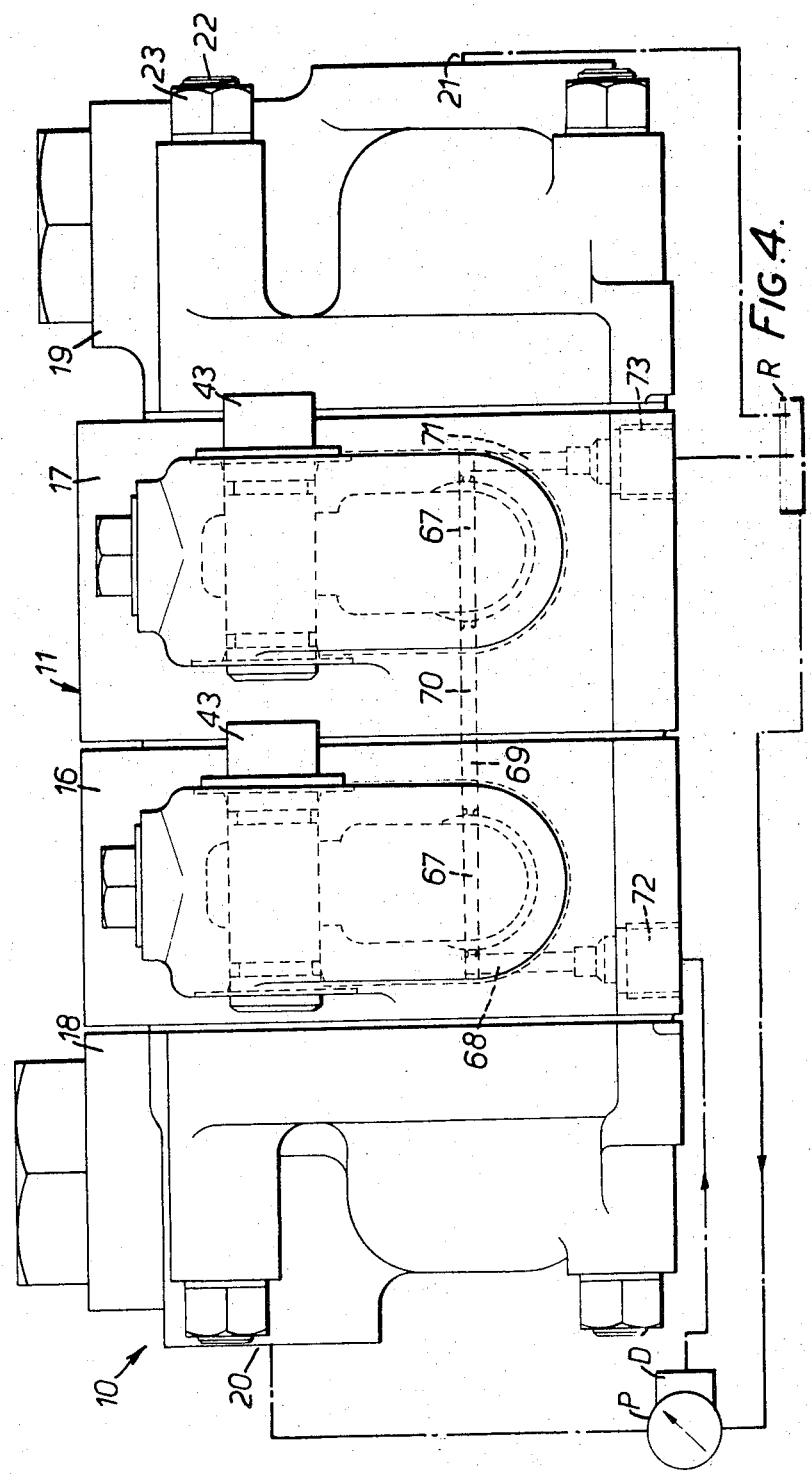

One embodiment of the invention will now be particularly described by way of example with reference to the accompanying drawings, of which, FIG. 1 is a cross-section of an hydraulic selector valve incorporating two parallel spools, FIG. 2 is a cross-section taken along the line II—II on FIG. 1, FIG. 3 is a front elevation of the valve shown in FIGS. 1 and 2 taken in the direction of the arrow III on FIG. 2, and, FIG. 4 is a side elevation of the valve shown in FIGS. 1 to 3, as viewed in the direction of the arrow IV on FIG. 2.

Referring to the drawings, a selector valve 10 comprises a casing 11 having two movable valve elements in the form of spools 12 and 13. The spools 12 and 13 are respectively housed in bores 14 and 15 formed respectively in casing plates 16 and 17. The valve casing is also provided with two end casing plates 18 and 19, the casing plate 18 having a first or main inlet connection 20 for the valve, while the casing plate 19 has means open to exhaust in the form of a first or main exhaust connection 21 for the valve.

The casing plates 18, 16, 17 and 19 are bolted together in that order by means of through bolts 22 and nuts 23, to form a banked assembly. Each of the casing plates 16 and 17 have service-line connections 24 and 25 which are connectible to a respective fluid pressure-operable service S as shown diagrammatically in FIG. 1.

Each bore 14, 15 is provided with nine annuli 26, 27, 28, 29, 30, 31, 32, 33 and 34, while each spool 12, 13 has four lands 35, 36, 37 and 38 with annuli 39, 40, 41 formed between them.

Each spool 12, 13 is operable by a control lever 42 fast with a transverse rod member 43 which extends into a chamber 44 at the right-hand end portion in FIG. 1 of the respective casing plate 16, 17. The shaft 43 has a short rod 45 passing through a hole 46 therein. The rod 45 has a ball end 47 which engages an aperture 48 in the right-hand end portion of the spool.

At its left-hand end portion in FIG. 1, the spool 12, 13 is provided with spring-centering means 49 of conventional form which ensures that the spool returns exactly to its neutral position when manual pressure on the lever 42 is relieved.

The service-line connections 24 and 25 of each casing plate 16, 17 are respectively in communication with the annuli 27 and 32 by means of ducts 50 and 51, while the annuli 26, 33 and 34 thereof are in communication with a continuous exhaust trunk 52 which, as seen in FIG. 2, extends around the interior edge portion of the assembled block.

The main inlet connection 20 opens directly to a feed passage 53, which in turn opens to a pair of passages 54, 55 together forming a duct of U-shape, one pair for each casing plate 16, 17. The passages 54, 55 open to the annuli 28 and 31 associated with the respective spool 12, 13. A check valve, diagrammatically shown at 56, is provided in the passage 53, there being one check valve for each spool so that flow can occur through the passage 53 only in the direction into the annuli 28, 31 of each spool, the flows to the two annuli thus being in parallel manner.

The main inlet connection 20 is also in communication through a duct 57, shown in FIG. 2, with a port 58 which opens into a port 59. The port 59 opens to the annulus 29 associated with the spool 12, and the annulus 29 is in communication with the annulus 30 through the annulus 40, this when the spool 12 is in its neutral position as shown in FIG. 2. The annulus 30 is in turn open through ports 60 and 61 to the annulus 29 associated with the spool 13. This annulus 29 is in communication with the associated annulus 30 through the annulus 40 of the spool 13, again when that spool is in its neutral position as shown in FIG. 2. The annulus 30 is open through a port 62 to a port 63 in the casing plate 19, which in turn is in communication with the main exhaust connection 21. In this way a first unloader passage is formed.

Metallic gasket plates 64, 65 and 66 are provided at the interfaces of the casing plates 18, 16, 17 and 19, and apertures in these gasket plates align with the various mating ports in the casing plates of the valve bank. Sealing rings (not shown) are provided in these apertures and thus by the provision of the gasket plates, a means is provided for housing the sealing rings without counterboring the various ports.

Each of the two spools 12 and 13 is provided with a diametral drilling 67, so positioned across the lands 38 thereof, that when the spools are in their neutral positions, these drillings 67 align with drillings 68 and 69 in the casing plate 16, and drillings 70 and 71 in the casing plate 17. As shown in FIG. 4, the casing plate 16 is provided with a connection 72 while the casing plate 17 is provided with a connection 73. With the two spools 12 and 13 in their neutral positions, as shown in FIGS. 1 and 2 of the drawings, a subsidiary unloader passage is provided between the connection 72, which forms a second or subsidiary inlet connection, and the connection 73, which forms a second or subsidiary exhaust connection, the subsidiary unloader passage being formed by the drillings 67, 68, 69, 70 and 71.

The subsidiary inlet connection 72 is connectible to a servo device D which forms part of the delivery-varying mechanism of a variable-delivery pump P shown diagrammatically in FIG. 4. This pump supplies liquid under pressure to the main inlet connection 20 of the valve 10.

The subsidiary exhaust connection 73 is connected to reservoir R, as is the main exhaust connection 21 of the valve.

In operation of the selector valve an fluid pressure-operable system above described, when the two valve spools 12 and 13 are in their neutral positions, the respective lands 36 and 37 close over the passages 54 and 55, and the respective services S are hydraulically held in the positions at which they are set. The pressure liquid available in the passages 54 and 55 is thus unable to pass into either of the ducts 50 and 51, but instead the pressure liquid available at the main inlet connection 20 is diverted through the first unloader passage which comprises the ports 59, 60, 61, 62 and 63, and annuli 29, 30, 40, to the main exhaust connection 21.

At the same time, and as already explained, with the two spools in the neutral position the subsidiary unloader passageway 67, 68, 69, 70, 71 places the servo device D of the associated variable-delivery pump P in communication with the reservoir R, so that the pump P operates at a low flow, or alternatively a zero displacement, condition, as required by the associated system.

If either one of the selector valves 12 or 13 is moved by its control lever 42 to either one of its operative positions on either side of the neutral position, the first unloader passage and also the subsidiary unloader passage are both blocked. Hence, the servo device D is no longer in communication with reservoir and thus a pressure build-up can occur within it, whereby the pump delivery-varying mechanism brings the pump on load to a high flow displacement condition and liquid delivered by the pump to the main inlet connection 20 can pass through the respective check valves 56 in the passageway 53 in parallel manner into the two pairs of passages 54 and 55. If, for example, the spool 12 is moved to the left in FIG. 1, liquid under pressure passes from the passage 55 through the annulus 41 and duct 51 to the service-line connection 25 and thence to the right-hand side of the service S for contraction of that service. Liquid exhausting from the left-hand side of the service passes back through the service-line connection 24, the duct 50, the annulus 39, and the annulus 26 into the exhaust duct 52, and thence through the main exhaust connection 21 to reservoir.

If, conversely, the spool 12 is moved to the right in the drawing, the service S operates to extend, and the flows of pressure liquid and exhausting liquid are in the converse sense through the valve.

It will be understood that with the variable-delivery pump P supplying liquid to the service S through the valve, some control on flow from the pump will be necessary and this is achieved by means of a constant power device forming part of the pump delivery-varying mechanism servo device D.

The invention is in no way limited to providing the subsidiary inlet connection and the subsidiary exhaust connection in casing plates which themselves also contain a spool, as in other embodiments one or other, or both, of these connections may be provided in the end casing plate or plates.

In some embodiments the subsidiary exhaust connection may be omitted and the subsidiary unloader passage then arranged to communicate with the main exhaust connection.

Again, the invention is in no way limited to the valve structure having two spools, as in other embodiments only one spool, or alternatively, more than two spools may be provided.

Further, the valve casing need not be of the stacked type, as in other embodiments it may be of the monobloc type.

The invention is in no way limited to the valve elements being of the spool type, as in other embodiments the valve elements may be of rectangular cross-section. Also, the valve elements need not be of the linear sliding type, as in other embodiments they may be of rotary type.

Although in the embodiment above described with reference to the drawings, the subsidiary unloader passage passes through both valve elements in the bank, in other embodiments it may be arranged that this passage passes through one of the elements, or, in a bank having more than two elements, through only some of the elements.

I claim:

1. A selector valve including a casing having a first inlet connection, a second inlet connection, a service-line connection and an exhaust connection, a displaceable valve element housed in the casing and adapted for movement from a neutral position to at least one operative position, means provided both in the casing and in said element which when the element is in its neutral position define a first unloader passage connecting the inlet connection and the exhaust connection and which also define a subsidiary unloader passage connecting said second inlet connection to exhaust, and feed passage means, within the casing, which is communicable with a portion of said first unloader passage and with said first inlet connection, said element when moved away from said neutral position closing said first unloader passage and said subsidiary unloader passage and opening said feed passage means to said service-line connection.

2. A selector valve including a casing having a first inlet connection, a second inlet connection, a service-line connection and an exhaust connection, a displaceable valve element housed in the casing and adapted for movement from a neutral position to at least one operative position, first duct means formed partly in said casing and partly by said displaceable valve element which, when that element is in its neutral position forms a first unloader passage which at one end portion is open to said first inlet connection and which extends across the valve from said first inlet connection to said exhaust connection, further duct means formed partly in said casing and partly be said displaceable valve element which when that element is in its neutral position forms a subsidiary unloader passage which at one end portion is open to said second inlet connection and which extends from said second inlet connection at least part-way across said valve and is open at its other end portion to exhaust, adjustment of said displaceable valve element away from said neutral position towards said operative position moving the parts of said first unloader passage and of said subsidiary unloader passage formed by said displaceable valve element out of registry with the parts thereof in said casing thereby substantially simultaneously to close both said first unloader passage and said subsidiary unloader passage, and feed passage means, within the casing, which is communicable with a portion of said first duct means and with said first inlet connection, and which is associable with said displaceable valve element whereby when that element is in an operative position said feed passage means is placed in communication with said service-line connection.

3. A selector valve as claimed in claim 2, wherein said displaceable valve element is of spool type housed in a respective bore formed in said casing.

4. A selector valve including a casing having a first inlet connection, a second inlet connection, a service-line connection and an exhaust connection, a displaceable valve element housed in the casing and adapted for movement from a neutral position to at least one operative position, first duct means formed partly in said casing and partly by said displaceable valve element which when that element is in its neutral position forms a first unloader passage which at one end portion is open to said first inlet connection and which extends across the valve from said first inlet connection to said exhaust connection, further duct means formed partly in said casing and partly be said displaceable valve element which when that element is in its neutral position forms a subsidiary unloader passage which at one end portion is open to said second inlet connection and which extends from said second inlet connection at least part-way across said valve and is open at its other end portion to exhaust, feed passage means formed within said casing which is communicable with a portion of said first duct means and with said first inlet connection, and further passage means formed partly by said displaceable valve element and partly in said casing, being so disposed that with said displaceable valve element in an operative position they place said feed passage means and said service-line connection in communication, adjustment of said displaceable valve element away from the neutral position moving the parts of said first unloader passage and of said subsidiary unloader passage formed by the displaceable valve element out of registry with the parts thereof in the casing, thereby substantially simultaneously to close both said first unloader passage and said subsidiary unloader passage, and the displaceable valve element substantially simultaneously placing said feed passage means in communication with said service-line connection by way of said further passage means.

5. A selector valve as claimed in claim 4, wherein said casing further includes a second exhaust connection, the subsidiary unloader passage being connectible to exhaust through said second exhaust connection.

6. A selector valve as claimed in claim 5 and including a plurality of said displaceable valve elements arranged in banked manner, wherein at least one of said service-line connections is provided for each element, said first inlet connection and said second inlet connection being common to the banked valve.

7. A selector valve as claimed in claim 6, wherein each displaceable valve element is housed in an individual casing plate, the casing plates being assembled in stacked relationship.

8. A selector valve as claimed in claim 7, wherein said first inlet connection and said first exhaust connection are provided in end casing plates forming end closure portions for the stacked casing plates of the bank, all the casing plates together forming said casing.

9. A selector valve as claimed in claim 7, wherein the second inlet connection and the second exhaust connection are respectively formed one in one of said casing plates which houses a displaceable valve element, and the other in another of said casing plates which houses a displaceable valve element.

10. A selector valve as claimed in claim 4, wherein the subsidiary unloader passage includes drillings provided in the casing and a drilling formed in and arranged transversely of said element, said drillings being in alignment when said displaceable valve element is in its neutral position.

11. A selector valve as claimed in claim 4, wherein a check valve is provided in said feed passage means, said check valve being openable only in a direction away from said inlet connection.

12. A selector valve as claimed in claim 4, wherein the casing is provided with a further service-line connection and said displaceable valve element is movable to another operative position in which it places said feed passage means in communication with said further service-line connection.

* * * * *